United States Patent Office 3,203,304
Patented Aug. 31, 1965

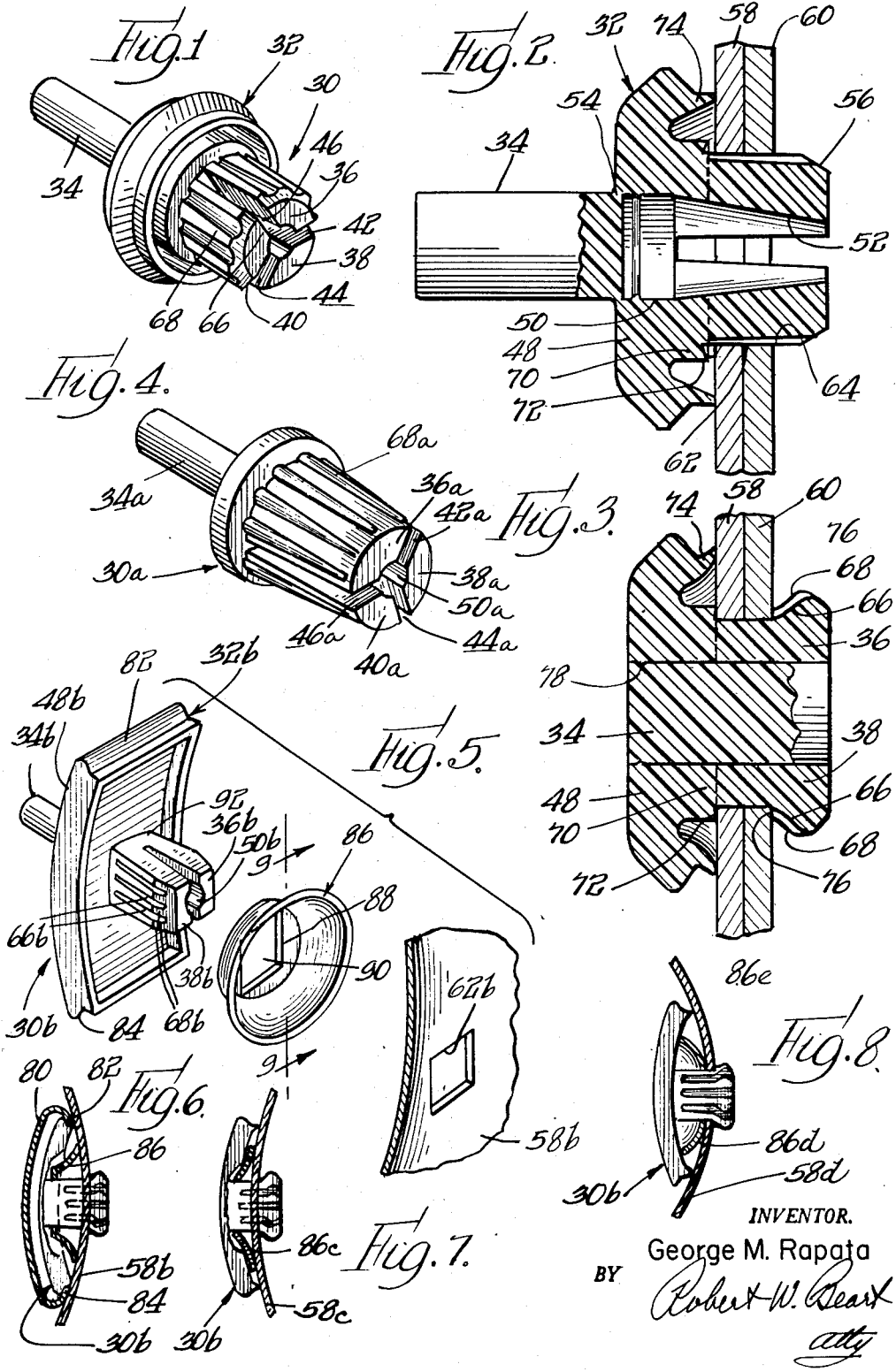

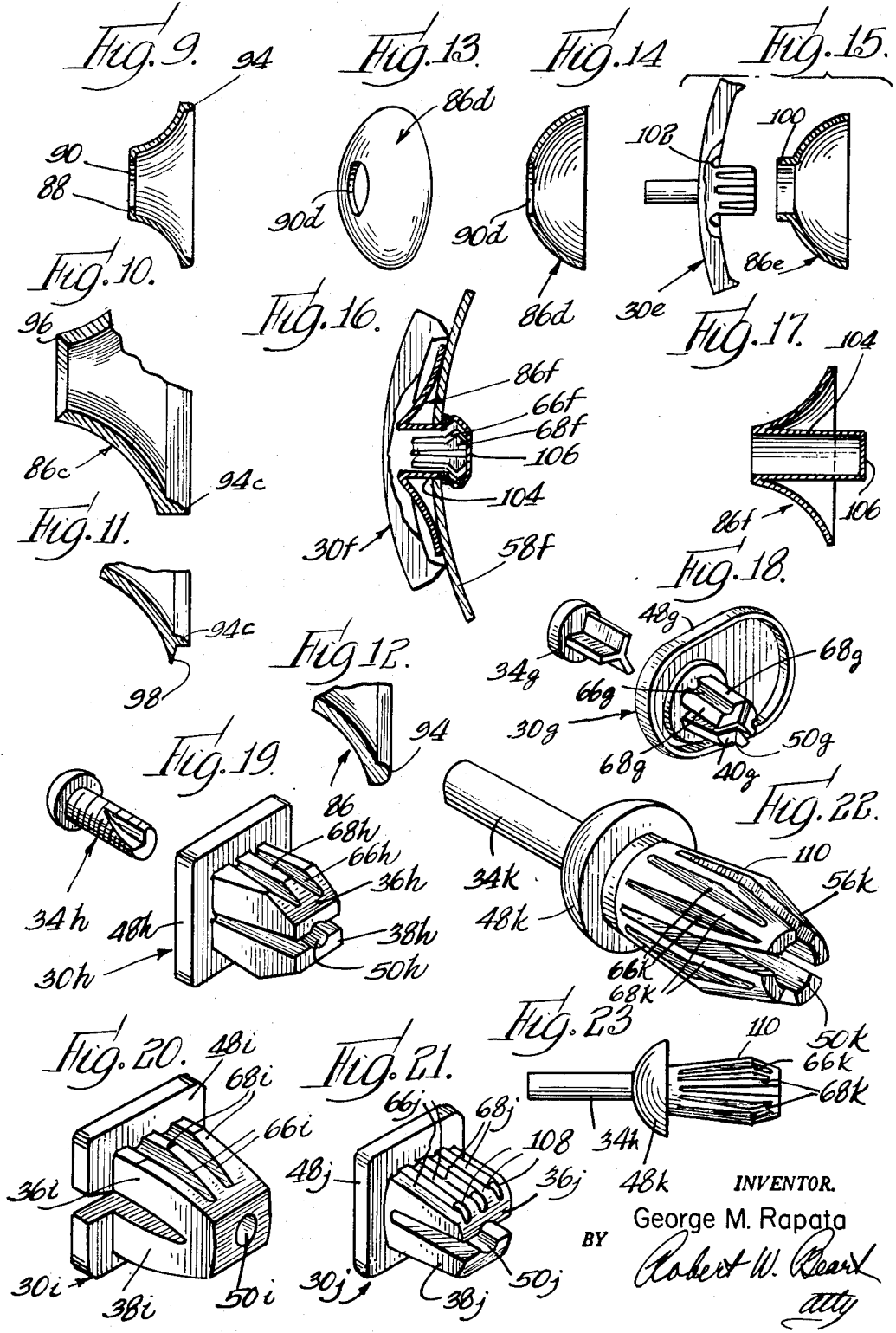

3,203,304
PLASTIC SEALING WASHER AND FASTENER ASSEMBLY
George M. Rapata, Park Ridge, Ill., assignor to Illinois Tool Works Inc., Chicago, Ill., a corporation of Delaware
Original application Sept. 8, 1960, Ser. No. 54,649. Divided and this application Feb. 27, 1964, Ser. No. 347,789
7 Claims. (Cl. 85—83)

This application is a division of my patent application entitled "Plastic Fastener," having Serial No. 54,649, and filed September 8, 1960.

This invention relates to novel fastener devices adapted to be applied to apertured work structures.

Fastener devices of the type generally contemplated herein have heretofore been suggested and include an expandable shank adapted to be inserted into an apertured work structure and an element such as a drive pin or screw adapted to be inserted into the shank for expanding the shank against the margin of the work structure aperture for securing the device with respect to the work structure. While certain of the heretofore proposed devices function satisfactorily, it has, in many instances, been necessary to provide devices with different shank lengths for different thicknesses of work structures. Furthermore, in many instances, it has been necessary to provide holes of different diameters in work structures of different thicknesses in order to accommodate the shanks of heretofore proposed devices, and certain of such devices have been formed so that the force required to apply the drive pin, screw or similar element to the expandable shank increases unduly when the devices are applied to relatively thick work structures. Fastening devices which overcome these problems are disclosed and claimed in my parent application referred to above.

The instant application is concerned with improvements over such fastening devices, and more particularly relates to the use of sealing means in conjunction with fastening devices of the above described type to prevent deterioration of the fastening assembly.

The entry of foreign substances such as moisture, dust and the like through work structure apertures and around fastener devices mounted with such work structures will readily deteriorate a fastening assembly. To overcome this problem, the present invention contemplates the sealing of the work structure aperture to prevent the passage of foreign substances therethrough and around the fastening devices.

Accordingly, it is an object of the present invention to provide fastening devices of the above described type with means for sealing the work structure aperture to prevent deterioration of the fastening assembly.

Another object of the present invention is to provide a sealing means for a fastening device wherein the latter is adapted to secure a molded strip to an apertured work structure.

Still another object of the present invention is to provide sealing means for a novel plastic fastener or anchor member of the expandable shank type which is adapted to be applied to work structures of widely differing thicknesses.

Other objects and advantages of the present invention will become apparent from the following description and the accompanying drawings wherein:

FIG. 1 is a perspective view of a fastening device or anchor member used with the fastening assembly of the present invention;

FIG. 2 is a partial sectional view showing the device of FIG. 1 partially applied to an apertured work structure;

FIG. 3 is a sectional view showing the device of FIGS. 1 and 2 fully applied to the work structure;

FIG. 4 is a perspective view showing still another type of fastening device or anchor member;

FIG. 5 is an exploded perspective view showing the fastening assembly of the present invention, and including a washer and an apertured work panel with which the fastening device is adapted to be assembled;

FIG. 6 is a partial sectional view on a reduced scale showing the elements of FIG. 5 in assembled relationship;

FIG. 7 is similar to FIG. 6 but shows the manner in which the fastener or anchor member may be applied to the convex side of a curved panel as well as the concave side of the panel, as illustrated in FIG. 6;

FIG. 8 is a view similar to FIG. 6 but shows a modified ararngement of the parts;

FIG. 9 is a sectional view of the washer shown in FIG. 5 taken generally along line 9—9 in FIG. 5;

FIG. 10 is a sectional view showing a modified embodiment of the washer;

FIG. 11 is a fragmentary sectional view showing a further embodiment of the washer;

FIG. 12 is similar to FIG. 11 but shows a margin of the washer of FIG. 9 in greater detail;

FIG. 13 is a perspective view of the washer shown in the assembly by FIG. 8;

FIG. 14 is a sectional view of the washer shown in FIG. 13;

FIG. 15 is an exploded view partially in section of a fastener and washer assembly incorporating another embodiment of the present invention;

FIG. 16 is a partial sectional view showing an assembly including another modified form of the present invention;

FIG. 17 is a sectional view of the sealing washer in the assembly shown in FIG. 16;

FIG. 18 is an exploded perspective view showing another type of fastening device used with the fastening assembly of the present invention;

FIG. 19 is an exploded perspective view showing still another type of fastening device;

FIG. 20 is a perspective view showing yet still another form of fastening device;

FIG. 21 is a perspective view showing still another construction of the fastening device used with the present invention;

FIG. 22 shows one further form of fastening device for use with the fastening assembly of the present invention; and FIG. 23 is a side elevational view showing the device of FIG. 22.

Referring now more specifically to the drawings wherein like drawings are designated by the same numerals throughout the various figures, a fastening device 30 of the type used with the sealing means to provide the fastening assembly of the present invention is shown in FIGS. 1–3. Other modified forms of the fastening device are shown in FIG. 4 and FIGS. 18–23. This device is preferably molded from a tough, resilient plastic material such as nylon or polyethylene. The fastening device 30 comprises a main body member 32 and a securing element or drive pin 34 which may selectively be formed integrally with or separately from the main body member.

The member 32 comprises an expandable shank provided by a plurality of axially extending shank sections 36, 38 and 40 separated from each other by generally axially etxending slots 42, 44 and 46. Trailing ends of the shank sections merge with and are integrally joined to a radially extending head section 48 adapted to overlie an outer surface of the structure.

A central bore 50 extends axially through the head portion 48 and also through the expandable shank provided by the shank sections 36, 38 and 40. As shown in FIG. 2, a portion of the bore 50 extending through the cricumferentially continuous head 48 is of substantially uniform diameter, while a portion of the bore extending through the expandable shank and defined by inner surfaces 52 of the shank section is tapered toward the entering ends of the shank sections. The bore 50 is adapted to receive the drive pin 34 which, in this embodiment, is initially integrally joined to the head 48 and 54. The integral junction 54 will, of course, be broken when the pin is forced into the bore.

The expandable shank provided by the sections 36, 38 and 40 has a generally cylindrical and, if desired, a slightly tapered outer configuration. The entering extremities of the shank sections are beveled as at 56 for facilitating entry of the shank sections into a work structure. The shank sections are adapted to be inserted into an apertured work structure which in the embodiment shown in FIGS. 2 and 3, includes work pieces or panels 58 and 60 having aligned apertures 62 and 64 of uniform diameter therethrough.

One of the important features of the fastening device is that the shank sections 36, 38 and 40 are formed with axially extending flutes or grooves 66 in their outer surfaces which provide ribs or lands 68 therebetween. The ribs or lands provide circumferentially interrupted and limited elements of the expandable shank for engagement with margin of the work structure aperture in the manner described below. In this particular form, it will be noted that the grooves or flutes progressively increase in width and slightly in depth toward the entering extremities of the shank sections and conversely the ribs or lands become progressively narrower, or, in other words, have side walls which taper toward the entering extremities of the shank sections. This arrangement facilitates expanding of the shank and forming of the lands or ribs around the margin of the work structure when the pin 34 is driven into the bore 50 in the manner described more fully below.

The head portion 48 includes an annular section 70 extending around and integral with trailing ends of the shank sections. The annular section 70 presents a clamping and sealing surface 72 which extends generally radially outwardly from the shank sections and is slightly relieved or undercut as shown in FIG. 2. When the device is fully applied to the work structure, as shown in FIG. 3, the narrow peripheral corner edge of the surface 72 will be aggressively urged against the outer surface of the work structure around the aperture 62 so as to provide a seal around the aperture.

The head portion 48 may include an annular resilient flange 74 which extends generally axially around and in spaced relationship with respect to the annular abutment section 70. As shown in FIG. 2, the annular flange 74 normally extends axially beyond the clamping and sealing surface 72 toward the entering extremities of the shank sections. Thus, when the device is fully applied to the work structure as shown in FIG. 3, the annular flange 74 will be aggressively urged against the outer surface of the work structure so as to provide a secondary seal. Furthermore, the resilient annular flange 74 will be deflected in the manner shown so as to provide a resilient clamping pressure for clamping the panels or work pieces 58 and 60 together.

The device 30 may be easily applied to the apertured work structure by inserting the shank sections through the aligned apertures in the work pieces or panels and then forcing the pin 34 into the bore 50. Initial entry of the shank sections into the apertured work structure is facilitated by the bevel 56 provided at the entering extremities of the sections and also by the slightly tapered formation of the generally cylindrical expandable shank.

When the pin 34 is driven into the bore 50, it passes relatively easily through the first portion of the bore in the head 48, since the diameter of this portion of the bore is substantially the same as the diameter of the pin. As the pin engages the tapering surfaces 52 of the shank sections, the shank sections are expanded radially outwardly as shown in FIG. 3. As this expansion occurs the ribs or lands 68 are forced against the edges of the apertures 62 and 64 and as a result of the relative high unit pressure applied against the limited areas of the lands, the portions of the lands in engagement with the edges of the apertures are deformed and compressed as shown in FIG. 3. At the same time, portions of the ribs or lands which project beyond the rear side of the work structure are expanded behind the work structure and substantially radially extending shoulders 76 are formed between the crushed portions of the lands or ribs and the expanded portions for secure positive engagement with the rear side of the work structure.

The lands or ribs 68 are formed so that the shoulders 76 may be produced at any point along the length of the ribs so that the device is particularly adapted to be applied to work structures having a wide variety of different thicknesses. Furthermore, since the configuration of the expandable shank provided by the shank sections is generally cylindrical either with or without a slight taper, the diameter of the apertures in the work pieces or panels should be the same, regardless of the thickness of the panels.

The tapering formation of the portion of the bore defined by the inner surfaces 52 of the shank sections tends to create progressively increasing resistance to the passage of the drive pin 34 into the bore. However, this tendency to increase the resistance of the entry of the drive pin and therefore the force necessary to apply the pin is largely offset or completely overcome by the above mentioned tapered formation of the ribs or lands 68. With this arrangement the surface area and cross section of the lands decreases so that the lands may be progressively more easily compressed and deformed from their trailing ends toward the ends entering extremities of the shank sections.

As indicated above, the head portion 48 may be formed with means for providing effective seals around the work structure aperture for preventing the passage of moisture dust and the like through the apertures and around the device. At the same time the pin 34 tends to seal the central bore 50. In order to insure the provision of a seal between the pin and the body member 32, a small annular bead 78 is continuously formed around the surface of the portion of the bore in the head 48, which bead is adapted to aggressively engage and partially imbed itself in the periphery of the drive pin 34 as shown in FIG. 3.

As shown in FIG. 3, the tapering inner surfaces 52 of the shank sections and the slots 42, 44 and 46 extend within and axially overlap the circumferentially continuous annular abutment section 70 of the head, as shown in FIG. 2. This construction promotes flexibility of the shank sections and facilitates expansion thereof while enabling the shank sections to be provided with relatively thick cross-sections for strength and durability. Furthermore, this construction tends to cause radial expansion of the annular abutment section 70 when the drive pin is driven into the bore 50. The expanded annular section 70 serves to provide a constant force tending to restrict the intermediate portion of the bore 50 surrounded thereby so that the drive pin is, in effect, ripped intermediate its ends for preventing unauthorized axial movement or loosening in either axial direction.

FIG. 4 shows a device 30a which is similar to the above described structure, as indicated by the application of identical reference numerals with the suffix a added to corresponding parts. A principal difference of this device lies in the specific formation of the ribs 68a. It will be noted that the ribs 68a are formed so that they project laterally outwardly from the substantially cylindrical surface provided by the shank sections while in the above described embodiment the lateral projecting ribs or lands are provided by forming grooves in the generally cylindrical surface. Furthermore, the ribs 68a have their lateral outwardly facing surfaces as well as their side surfaces tapered toward the entering extremities of the shank sections for further progressively facilitating collapsing or deforming of outer end portions of the ribs when the device is applied to a work structure.

As has been previously discussed, the present invention concerns a fastener assembly including a fastener device of the type just described as used in conjunction with a sealing washer. This combined fastener and washer assembly is shown in FIGS. 5–8 and 15–16, and the other drawing figures relate either to the fastener device or the sealing washer. FIGS. 5 and 6 show one embodiment of the present invention having identical reference numerals as the above described parts with the exception of the suffix $b$ which has been added to corresponding parts of the fastener device. The expandable shank of the fastener device here is provided with a generally rectangular or polygonal cross-sectional shape for cooperative engagement with edges of a polygonal aperture 62b in the work piece for preventing the fastening device from turning relative to the work piece. Furthermore, the head portion 48b is formed so that it is particularly suitable for retaining work pieces such as a channel shaped molding strip 80 as shown in FIG. 6. Thus the head portion 48b is elongated for traversing the width of the molding strip and is provided with beveled ends or abutment surfaces 82 and 84 for overlying inturned flanges of the channel-shaped molding strip.

In accordance with the principles of the present invention, it is contemplated that a washer 86 may be assembled with the fastening device for providing a seal around the work piece aperture since, as shown best in FIG. 6, the head portion of the fastening device does not mate with the surface of the work piece. The washer shown in this embodiment is also shown in FIGS. 9 and 12 and comprises a resilient generally bell-shaped body formed either from a tough resilient plastic material similar to that of the fastening device or from metal. At the smaller end of the bell-shaped body there is provided an inverted flange 88 adapted sealingly to engage the under surface of the head portion 48b. The flange 88 is provided with a polygonal aperture 90 for snugly receiving the shank sections, which shank sections merge with each other and present a circumferentially uninterrupted shank portion 92 shown best in FIG. 5 for further providing a seal between the shank and the flange 88 of the washer. The opposite end of the washer is provided with an axially projected rounded bead 94 for providing a seal between the washer and the work piece.

FIG. 7 shows the manner in which the fastening device 30b may be applied to the convex rather than the concave side of an arcuate work piece. This embodiment further shows the fastening device assembled with a sealing washer 68c. This washer differs from the above described washer 86 in that it is provided with an axially facing relatively sharp edge 96 at its smaller end for impingement against the under surface of the fastener head. Furthermore, the above mentioned rounded bead has been replaced by axially extending flange 94c which presents a relatively sharp knife edge for impingement against and sealing engagement with the surface of the work piece. FIG. 11 shows a further slight modification of a generally bell-shaped washer of the type described above, in which modification the large end of the washer is formed so as to present a radially extending surface 98 outwardly of the flange 94c, which surface provides a stop for limiting collapsing of the sealing flange 94d when the washer is compressed against a work piece in a manner generally indicated in FIG. 7.

FIG. 8 shows another application of the fastener 30b in which the fastener is assembled with a modified sealing washer 86d. The washer 86d is also shown in FIGS. 13 and 14. In this embodiment the washer is dome-shaped or generally semi-spherical in configuration. FIG. 8 illustrates the fact that the sealing washer may be assembled with the fastener so that the smaller end of the washer sealingly engages the work piece around the aperture while the larger end of the washer sealingly engages the under surface of the fastener head. In other words, the dome-shaped washer and also the bell-shaped washer described above may, in many instances, be selectively positioned with either end in engagement with the head of the work piece.

FIG. 15 shows a structure similar to that of FIGS. 5–8, as indicated by the application of identical reference numerals with the suffix $e$ added to corresponding parts. In this embodiment the washer 86e is provided with an axially extending neck portion 100 which is adapted to seat within an annular groove 102 formed in the under surface of the fastener head for providing an improved seal.

FIGS. 15 and 17 show a further embodiment of the present invention which is similar to the structures of FIGS. 5–15, as indicated by the application of identical reference numerals with the suffix $f$ added to corresponding parts. In this embodiment the washer 86f is provided with an elongated axially extending sleeve 104 adapted snugly to receive the shank sections of the fastener. The sleeve is imperforate and includes a closed end wall 106 so as to preclude any possibility of leakage through or between the shank sections of the fastener. The wall of the sleeve 104 is quite thin as compared with the main body of the washer so that when the assembled fastener and washer are applied to the apertured work piece, as shown in FIG. 16, the portion of the sleeve extending beyond the inner side of the panel may be easily stretched by the expanding shank sections.

Other types of fastening devices which are shown in FIGS. 20–23 may be employed with the sealing washer of the present invention. FIG. 18 shows one of these forms having the same reference numerals used in FIGS. 1–3 with the suffix $g$ added to corresponding parts. In this form, the retaining head 48g has a configuration specifically different from that of the corresponding parts described above. Furthermore, the central passageway 50g through the fastener is formed with a generally Y-shaped cross-section rather than as a circular bore, and the drive pin 34g is provided with a complementary Y-shaped transverse cross-section. This specific construction promotes a more uniform distribution of the expanding pressure around the entire periphery of the shank when the drive pin is forced into the aperture or passageway 50g.

FIGS. 19–20 and 21 respectively show fastening devices 30h, 30i, and 30j which incorporate specifically different structural forms of the fastening device. In all of these figures, the shank sections have a polygonal overall transverse cross-section and the straight sides of the shank sections are adapted to engage side edges of complimentary polygonal apertures in work pieces for preventing the fasteners from rotating within the work piece apertures. Thus, these fasteners are particularly adapted to utilize a securing element such as a screw which may be threaded into their axially extending bores rather than a drive pin. Such a screw is illustrated by the screw 34h shown in FIG. 19. The walls of the bores of these devices are smooth or unthreaded, as are the bore walls of all of the other devices disclosed herein so that when the screw is applied thereto, it will tend to form or impress complementary thread segments in the bore walls and also expand the shank section. It will be appreciated that, if desired, either integral or separate drive pins could be utilized in the embodiments of FIGS. 19–21, and a screw member could be used in place of the drive pins of the other embodiments disclosed herein. In addition to the previously mentioned features, the form of the fastener device shown in FIG. 21 illustrates how protuberances or nibs 108 may be formed on the shank sections so as to project laterally outwardly of the ribs or lands at the entering extremities of the shank sections. These protuberances or nibs may serve to retain the fastener loosely and temporarily within an apertured work piece until the complementary screw member or drive pin is applied.

FIGS. 22 and 23 show a still further form of fastener device which is similar to structures described above as indicated by the application of identical reference numerals with the suffix $k$ added to corresponding parts. The central bore 50$k$ is initially formed with a substantially uniform diameter throughout while the shank sections are provided with first surface portions 110 which flare outwardly from the head 48$k$ to a junction with the tapering or beveled entering end portions 56$k$. With this arrangement the shank sections will be collapsed upon insertion into a work structure aperture. Subsequently the shank sections will be expanded and the ribs or lands will be formed around the margin of the work piece in the manner described above when the drive pin is forced into the bore 50$k$. It will be noted that the grooves 66$k$ become progressively deeper and the ribs or lands become progressively narrower in a direction extending from the head of the fastener along the flaring portion of the shank sections to the junction with the tapering end portion of the shank sections. The progressively increasing depth of the grooves compensates for the progressively increasing thickness of the flaring portions of the shank sections so that the shank sections may be readily expanded and formed around the margin of the work structure aperture in the manner described above.

While the preferred embodiments of the present invention have been shown and described herein, it is obvious that many structural details may be changed without departing from the spirit and scope of the appended claims.

I claim:

1. A fastening assembly comprising a fastening device and a sealing washer said device including a head portion for overlying one side of an apertured work structure, and a plurality of axially extending shank sections for insertion through the aperture of said work structure, said device having a passageway extending axially therein and partially defined by inner surfaces of said shank sections and adapted to accommodate an element insertable therein for expanding said shank sections, and said washer including a resilient annular imperforate body surrounding said shank sections and having axially offset inner and outer margins, said inner margin being in engagement with said shank sections for retaining said device and washer in assembled relationship, one of said washer body margins being sealingly engageable with an under surface of said head portion and the other of said washer margins being sealingly engageable with the work structure when the assembly is applied thereto, said washer margin engageable with the work structure having an axially projected edge whereby the surface area initially engageable is less than the radial cross sectional area of the washer body and an axially extending thin-walled expandable sleeve integral with said inner margin and having a closed end spaced from said inner margin and adapted to receive and envelop said shank sections.

2. A plastic sealing washer for use with a fastening device having a head portion adapted to overlie one side of an apertured work structure and a shank portion for insertion through the aperture of said work structure to retain said fastening device therein, said washer comprising a thin resilient annular imperforate arched body of a substantially constant thickness in section throughout its length and concave in the outward direction throughout its length so as to define an essentially bell shape configuration, said body surrounding said shank portion and connecting axially spaced inner and outer margins, said outer margin being of a substantially greater diameter than said inner margin, said inner margin being sealingly engageable with said fastening device, a continuous annular sealing lip extending axially from and beyond said washer body adjacent the periphery of said outer margin in an axial parallel direction away from said inner margin for sealing engagement with the work structure when the washer and fastener are applied thereto, said lip having an outer surface which is substantially straight in an axial direction through at least a portion of its length.

3. A device of the type claimed in claim 2 wherein said sealing lip is axially convergent in transverse section to provide a thin edge at its extremity for sealing engagement with said work structure.

4. A device of the type claimed in claim 2 wherein said outer margin is provided with an annular portion which extends radially outwardly of and protectively overlies said axially extending sealing lip.

5. A device of the type claimed in claim 2 wherein said sealing lip is generally semi-circular in transverse section at its terminal end and presents a rounded edge for engagement with said work structure.

6. A device of the type claimed in claim 2 wherein said washer includes an axially extending thin-walled expandable sleeve integral with said inner margin and having a closed end spaced from said inner margin and adapted to receive and envelop said shank section.

7. A device of the type claimed in claim 2 wherein said inner margin includes a radially inwardly extending flange means the inner extremity of which defines a complementary aperture for sealing engagement with said shank section.

References Cited by the Examiner

UNITED STATES PATENTS

| 1,700,354 | 1/29 | Foss | 85—84 |
|---|---|---|---|
| 2,219,423 | 10/40 | Kurtz | 85—50 |
| 2,756,795 | 7/56 | Clingman. | |
| 2,795,144 | 6/57 | Morse. | |
| 2,928,445 | 3/60 | Van Buren. | |
| 2,976,345 | 3/61 | Whitted | 174—153 |
| 2,983,008 | 5/61 | Von Rath. | |

FOREIGN PATENTS

| 1,006,733 | 4/57 | Germany. |
|---|---|---|
| 20,687 | 9/04 | Great Britain. |
| 771,555 | 4/57 | Great Britain. |

CARL W. TOMLIN, *Primary Examiner.*

EDWARD C. ALLEN, *Examiner.*